(12) United States Patent
Hofschulte et al.

(10) Patent No.: US 7,712,391 B2
(45) Date of Patent: May 11, 2010

(54) GEARING MECHANISM AND VEHICLE SEAT WITH SUCH A GEARING MECHANISM

(75) Inventors: Wolfram Hofschulte, Bonndorf (DE); Urban Knöpfle, Titisee-Neustadt (DE); Olav Schulte, Stuttgart (DE)

(73) Assignee: IMS Gear GmbH, Eisenbach (DE)

( * ) Notice: Subject to any disclaimer, the term of this patent is extended or adjusted under 35 U.S.C. 154(b) by 718 days.

(21) Appl. No.: 11/224,024

(22) Filed: Sep. 13, 2005

(65) Prior Publication Data
US 2006/0060015 A1    Mar. 23, 2006

(30) Foreign Application Priority Data
Sep. 21, 2004    (DE)    ............ 10 2004 046 048

(51) Int. Cl.
*F16H 1/16*    (2006.01)
*F16H 57/02*    (2006.01)

(52) U.S. Cl. .................. 74/425; 74/606 R

(58) Field of Classification Search ........... 74/425, 74/606 R, 89.14, 89.23, 89.28; 248/298.1, 248/424, 429, 430; 297/362.14, 330
See application file for complete search history.

(56) References Cited

U.S. PATENT DOCUMENTS

| | | | |
|---|---|---|---|
| 3,184,209 A | | 5/1965 | Colautti |
| 3,735,645 A | * | 5/1973 | Pickles ............. 74/606 R |
| 4,802,374 A | | 2/1989 | Hamelin et al. |
| 6,032,550 A | * | 3/2000 | Rugh ............. 74/425 |
| 6,260,922 B1 | * | 7/2001 | Frohnhaus et al. ....... 297/330 |

FOREIGN PATENT DOCUMENTS

| | | |
|---|---|---|
| DE | 1755740 | 1/1972 |
| DE | 29 03 782 A1 | 8/1980 |
| DE | 29 25 032 A1 | 1/1981 |
| DE | 35 19 058 C2 | 12/1986 |
| DE | 36 40 197 A1 | 10/1987 |
| DE | 37 25 158 C2 | 2/1988 |
| DE | 37 26 801 C2 | 2/1989 |
| DE | 41 01 470 C1 | 6/1992 |
| DE | 198 61 100 A1 | 2/2000 |
| DE | 103 08 028 A1 | 9/2004 |
| EP | 0359 008 A1 | 3/1990 |
| EP | 0 992 711 A2 | 4/2000 |
| WO | 02/070299 A1 | 9/2002 |

* cited by examiner

*Primary Examiner*—Thomas R Hannon
*Assistant Examiner*—James Pilkington
(74) *Attorney, Agent, or Firm*—The Nath Law Group; Jerald L. Meyer; Stanley N. Protigal

(57) ABSTRACT

The invention relates to a gearing mechanism for the adjustment of two reciprocally adjustable parts (60, 61), especially vehicle parts of a seat adjustment device, a window lifter or a sunroof, wherein the first of the parts (60) has a nonrotating spindle (62) or a fixed tooth rack. The gearing mechanism is formed with a wormwheel (4, 41), which has a spindle nut (42) non-rotatingly connected thereto in order to drive the spindle (62) or a worm non-rotatingly connected thereto in order to drive the tooth rack, with a worm (3, 31) that can be driven so as to transfer a driving force to the wormwheel (4, 41), and with a gear housing (1), which houses the worm (3) and wormwheel (4) in a supporting manner, and which can be connected immovably with the second of the parts (61) in its adjusting direction, wherein the gear housing (1) is formed of a single-piece body with a worm support (14) and a wormwheel support (19).

7 Claims, 3 Drawing Sheets

GEARING MECHANISM AND VEHICLE SEAT WITH SUCH A GEARING MECHANISM

EP 0 979 750 A 2 describes a vehicle seat with an adjustment device having a spindle and an associated spindle nut. The spindle is affixed in a non-rotating manner to a first adjustment element of the adjustment device. The nut is rotatingly located in a second adjustment element, with the second adjustment element being supported along with the first adjustment element in the manner of a rail guide. The exterior casing of the spindle nut forms a wormwheel that is connected with a worm of a rotary drive. The configuration serves to displace a vehicle seat attached to the second adjustment element with respect to the first adjustment element, which is firmly attached to a vehicle floor. The configuration disadvantageously consists of a number of individual parts, which must be placed and affixed directly in the rail configuration formed by the two adjustment elements. Any repairs that may be required therefore involve a great deal of time and effort.

U.S. Pat. No. 4,802,374 describes an adjustment drive for a vehicle seat in which such a spindle is connected non-rotatingly with a vehicle seat rail that forms an adjustment element. The spindle is however attached outside of the rail guide, which is considered undesirable by vehicle manufacturers. Another seat adjustment device with a self-restricting adjustment drive for vehicle seats is known from DE 1 755 740. In this configuration as well, there are a number of components in addition to a rail guide.

An elaborately constructed gearing mechanism configuration for adjusting a vehicle seat is also known from WO 02/070299 A1. In this configuration, an elaborately constructed gearing mechanism is described, which is intended to absorb forces created in the event of an accident.

Figure 3:
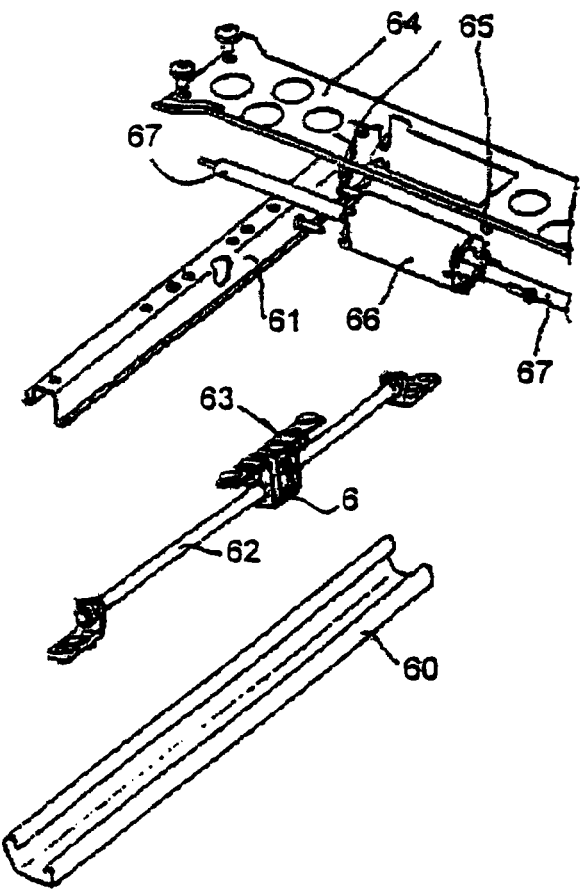

EP 1 068 093 B1 describes a gearing mechanism as shown in FIG. 3 for the adjustment of two reciprocally adjustable parts 60, 61, especially vehicle parts of a seat adjustment device, a window lifter, or a sunroof, wherein the first of the parts 60 forms a lower rail permanently attached to a vehicle floor, in which a non-rotating spindle 62 or a fixed tooth rack is mounted. Gearing mechanism 6 sits on spindle 62 and is adjusted back and forth by activation along spindle 62. Gearing mechanism 6 is mounted in a bracket 63, which is adjusted back and forth together with the second of the adjustable parts 61. Bracket 63 is permanently connected with the second of the reciprocally adjustable parts 61, which forms an upper rail, which is connected adjustably with the lower rail. The upper rail is connected with further components of the vehicle seat via a retaining plate 64. Also connected to the retaining plate 64 via fastening element 65 is a drive 66, whose drive shaft 67 is connected with a drivable worm of gearing mechanism 6.

Gearing mechanism 6 consists of a wormwheel, which has a spindle nut non-rotatingly connected thereto in order to drive the spindle or a worm that is non-rotatingly connected thereto to drive the tooth rack, of a worm that can be driven to transfer a driving force of the drive to the wormwheel, and of a gear housing that houses the worm and the wormwheel in a supporting manner, and which is immovably connected with the second of the adjustable parts 61 in its adjustment direction. The gear housing consists of numerous housing plates, especially at least two housing plates that can be connected to one another by means of plug-in connections. The position of the housing plates relative to one another is fixed in all spatial directions by means of the plug-in connections, with the plug-in connections being simultaneously configured as supporting connection points to absorb the gear forces. If there are only two housing plates, the gear housing consists of two L-shaped housing plates. If there are at least four structural elements, the gear housing consists of at least two pairs of facing, rail-shaped housing plates, which in any case involves an elaborate gear configuration, which also necessitates a number of additional support elements or support assisting elements, such as shims, in addition to the actual housing parts. In addition to the elaborate combination of numerous individual parts, it is also disadvantageous that the tolerances of the individual parts must be matched to one another. The individual housing parts of such a gear housing are welded together.

Also known is a configuration that provides two individual pressure housing parts that are fitted with a spindle nut, a friction washer, and bearing linings, as well as a worm and associated bearing linings, and is subsequently closed through plastic deformation of plug-in connections on the halves of the housing.

It is the aim of the invention to simplify a gearing mechanism for the adjustment of two reciprocally adjustable parts, especially vehicle parts of a seat adjustment device. In particular, the required number of parts should be reduced, and an easier construction and/or exchange of gear parts should be enabled.

Accordingly, a gearing mechanism for adjusting two reciprocally adjustable parts, especially vehicle parts of a seat adjustment device, a window lifter or a sunroof, is preferable, wherein the first of the parts has a nonrotating spindle or a fixed tooth rack, and wherein the gearing mechanism is configured with a wormwheel that has a spindle nut that is nonrotatingly connected thereto in order to drive the spindle or a worm that is nonrotatingly connected thereto in order to drive the tooth rack, with a worm that can be driven to transfer a driving force to the wormwheel and with a gear housing that houses the worm and the wormwheel in a supporting manner, and that is immovably connected with the second of the parts in its adjustment direction, with the gear housing being configured as a single-piece body with a wormwheel and a wormwheel support.

Advantageous embodiments are the subject matter of the dependent claims.

A gearing mechanism is preferred in which the worm support is configured as one or two facing walls, especially as side walls of the gear housing, particularly on the upper section of the gear housing, and has a worm support access opening in the mounting direction of the worm, with the worm support access opening extending through the corresponding side wall up to the underside of the side wall and/or the gear housing.

A gearing mechanism is preferred in which the space between the worm support access opening or a section in the transition area between the worm support access opening and the worm support is smaller than one diameter of a worm shaft of the worm.

A gearing mechanism is preferred in which the wormwheel support is in the form of one or two facing walls, particularly below the upper worm, and has a wormwheel support access opening, such that the wormwheel support access opening extends through a corresponding sidewall up to the underside of the sidewall and/or the gear housing.

A gearing mechanism is preferred in which the space between the wormwheel support access opening or a section in the transition area between the wormwheel support access opening and the wormwheel support is smaller than one diameter of a wormwheel shaft of the wormwheel.

A gearing mechanism is preferred in which the side walls with the worm support are formed between the side walls with the wormwheel support. In a simple embodiment, the side walls with the wormwheel support form the facing sides of a housing and the side walls with the worm support form the two walls between the facing sides. In a top view, these four walls therefore form side walls of a square or rectangular housing. Also possible, however, are embodiments in which two of the facing walls are positioned relative to the two other walls at an angle between a worm axis and a wormwheel axis, where the angle can theoretically be between 1 and 179°.

A gearing mechanism is preferred in which the side walls in the underside section of the gear housing consist of two legs at a distance from one another, the distances between two adjacent legs being wide enough and/or elastic enough as worm support access openings to feed a worm shaft through and/or as wormwheel support access openings to feed a wormwheel shaft through.

A gearing mechanism with a housing closure to close the underside of the gear housing, such that the housing closure affixes the legs to one another after the mounting of the housing closure, is preferred. A housing closure, especially in the form of a pan covering the entire bottom of the housing or a pegged structure, is particularly transposable.

A gearing mechanism with a housing closure to close the underside of the gear housing, such that the housing enclosure part provides support from below for the wormwheel and/or the worm in the gear housing, is preferred.

A gearing mechanism is preferred in which at least one inner side wall has an insertion bevel in the direction of the worm support access opening and/or the wormwheel support access opening.

The assembly and mounting of such a gearing mechanism is accordingly simplified in an advantageous manner. In the simplest case, this is accomplished by a reduction to three important parts, namely a single-piece gear block in the form of a gear housing, a worm, and a spindle nut. Here the worm and spindle nut can be used in a known embodiment, wherein the spindle nut in particular has a globoid gearing with a cylindrical portion. The gear block can be produced simply and cost-effectively, for example, as an injection molded plastic part with correspondingly molded mounts for geared parts of the gearing mechanism. The individual parts, i.e. especially the worm and the spindle nut, are mounted to their supports in the gear unit via the corresponding mounting devices and/or guide devices, and then rotatably positioned about their respective longitudinal axes by means of a snap and/or catch connections. According to a preferred embodiment, a gear cover will be snapped into two corresponding locking mounts as a housing closure in order to secure the combination of wormwheel and spindle nut in the gear housing.

The use of such a very small gearing mechanism between two seat rails as the relatively reciprocally adjustable parts of a vehicle seat is preferred. In principle, however, this configuration is applicable in various applications of worm gears.

Figure 1:
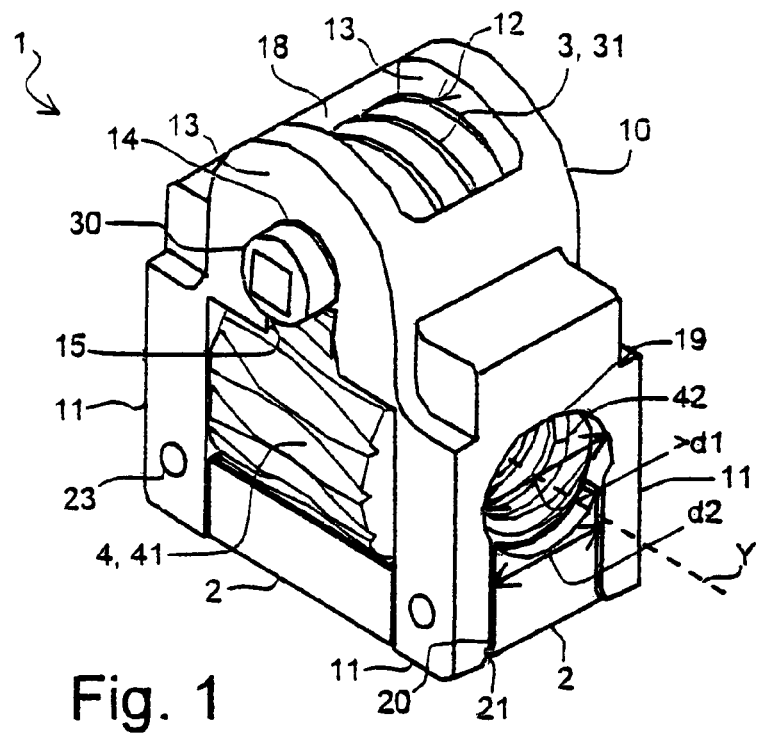
Figure 2:
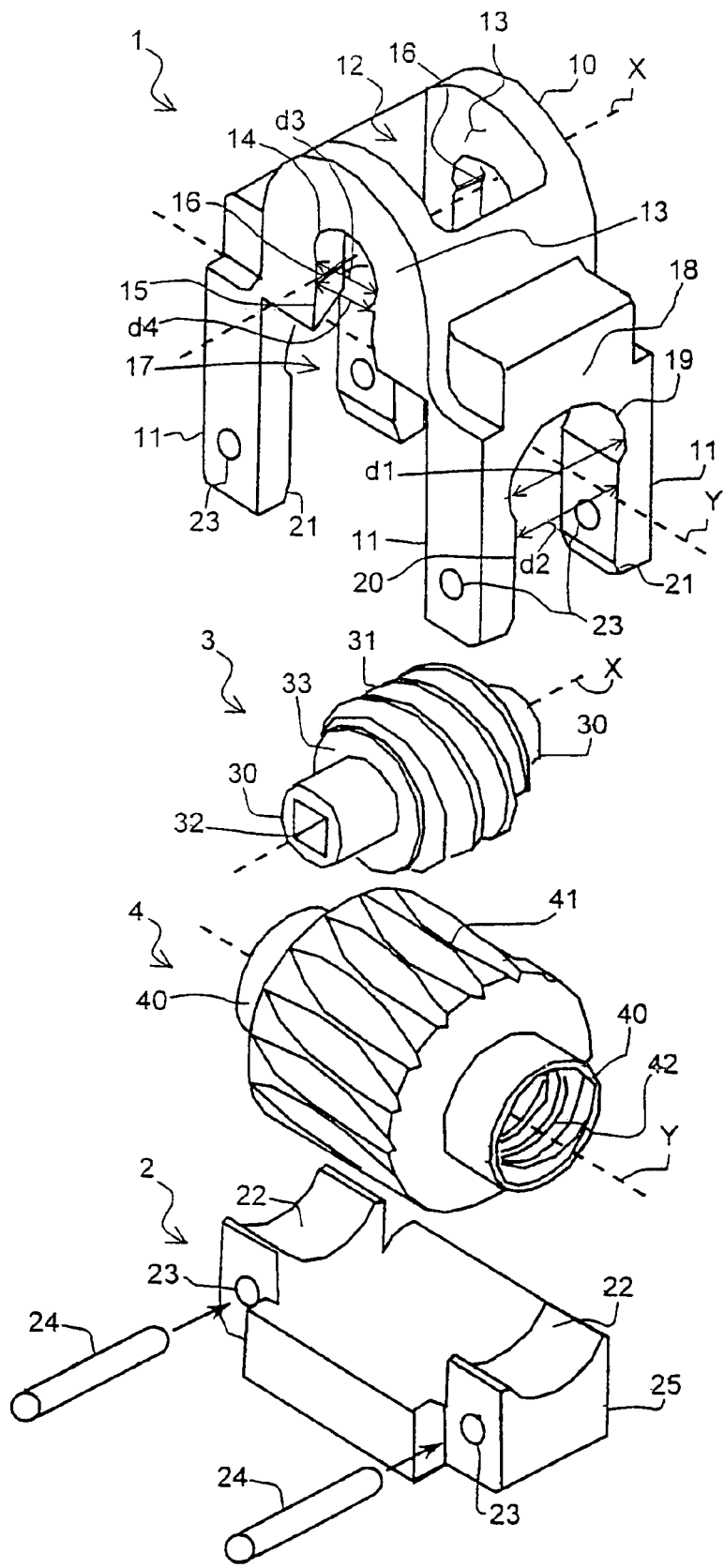

One embodiment will be elucidated below in greater detail based on the drawing, which shows:

FIG. 1 a gear housing with a mounted worm and a mounted wormwheel according to a particularly preferable example embodiment;

FIG. 2 the elements of the configuration of FIG. 1 in an exploded view; and

FIG. 3 a schematic representation of individual elements of a vehicle seat assembly and a rail guide with a gearing mechanism according to the state of the art.

Figure 4:
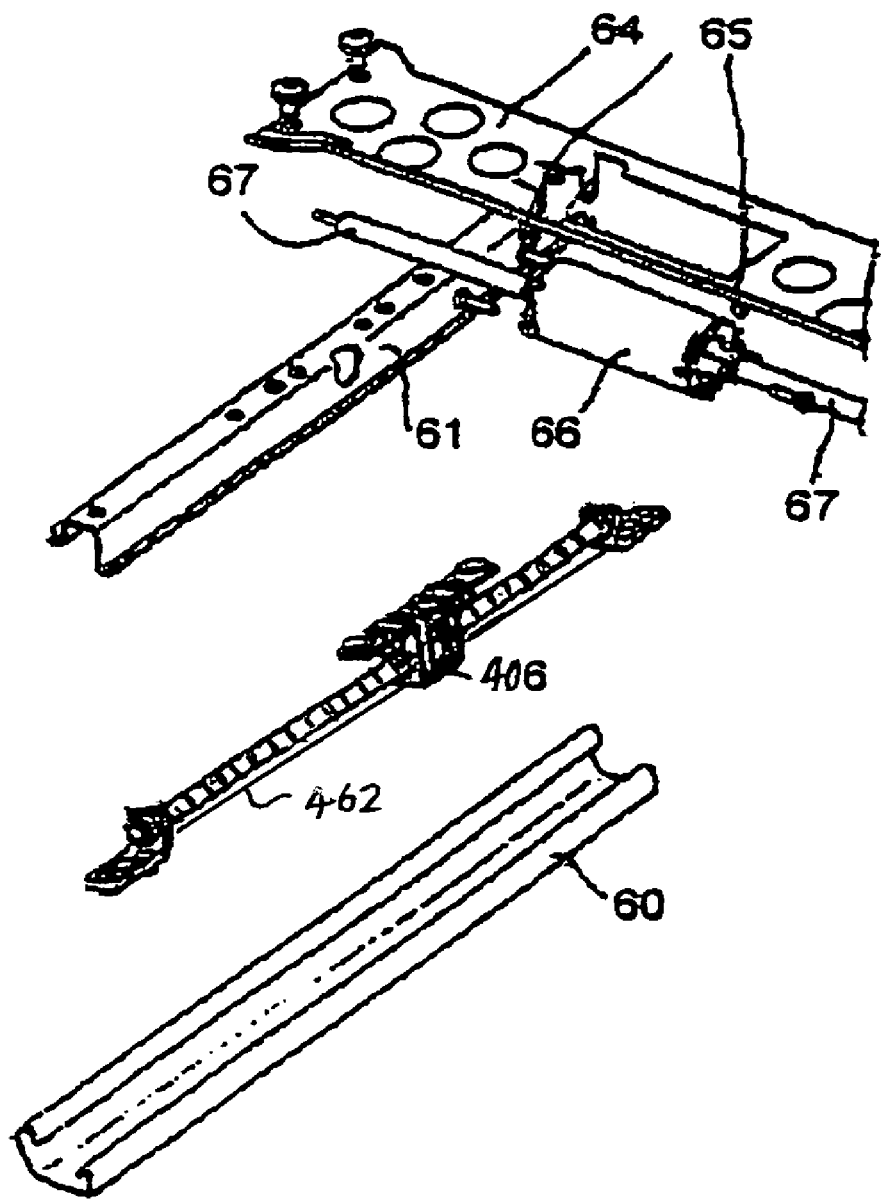

FIG. 4 is a schematic representation of individual elements of a vehicle seat assembly and a rail guide, using a fixed tooth rack.

FIGS. 1 and 2 show an assembled and an exploded view of a gearing mechanism and its components according to a particularly preferred embodiment. A one-piece gear housing 1 houses both a worm 3 and a wormwheel 4. Optionally, the configuration can also be closed from the underside by means of a housing closure 2 or a housing cover.

Gear housing 1 consists of a top part 10, on the corners of the undersides of which legs 11 or downward-extending bar-shaped brackets are formed. The spatial directions above and below provided in this case serve only for the illustrated description, because ultimately the assembled gearing mechanism can be mounted in any spatial orientation within a drive device.

The top part 10 of gear housing 1 has a mounting or worm space 12 to support worm 3. Worm 3 consists of a known arrangement of a worm shaft 30 and a worm gearing 31, which is formed around the central middle area of worm shaft 30. One end of worm shaft 30 advantageously has a drive shaft mount 32, which is used to affix a drive shaft to worm shaft 30, so that worm 3 can be moved in rotation about its longitudinal axis X. Prior to mounting worm 3 in worm space 12, ring-shaped bearing washers 33 are preferably placed on both worm shaft ends 30, which project from worm 3 on both sides of worm gearing 31. This is not absolutely necessary, however, and can be omitted, for example in the case of a globoid gearing with a cylindrical portion.

Worm supports 14 are formed in the two facing first side walls 13 of top part 10 of gear housing 1 constituting worm space 12. Here at least one of the worm supports 14 is in the form of a through-hole through the corresponding first side wall 13, in order to allow the corresponding worm shaft 30 and/or the drive shaft which is attached thereto to pass through the first side wall 13. Here the open diameter of worm supports 14 is greater than one diameter d3 of worm shaft 30. Preferably, however, as little clearance as possible will be permitted here.

To mount worm 3 in worm support 14, a worm support access opening 15 is formed in each of the two first side walls 13, with each of said worm support access openings 15 extending from worm support 14 to the underside of top part 10 or the underside of the corresponding first side walls 13. This permits worm 3 to be mounted from the underside into worm support 14, so that the ends of worm shaft 30 can be fed through the two corresponding worm support access openings 15.

According to a simple embodiment, to retain worm 3 in worm space 12, wormwheel 4 can be mounted in gear housing 1 and supported in this gear housing such that worm 3 is securely mounted in worm support 14 and supported from below by the wormwheel.

According to the preferred embodiment, however, the wall of worm support access opening 15 has a transverse ridge, i.e. especially running parallel to worm axis X, as retaining ridge 16. An open space d4 between retaining ridges 16 on the two facing walls of worm support access opening 15 is smaller than diameter d3 of worm shaft 30. The walls of gear housing 1, at least in the area of worm support access opening 15 and/or the wall of worm shaft 30, consist of an elastic material that yields when worm 3 is mounted in worm support 14 through the worm support access openings 15. After worm shaft 30 is mounted above retaining ridge or ridges 16, worm shaft 30 is supported with its two ends capable of rotating in worm support 14, while it is prevented from slipping downwards, out of worm support 14, by the retaining ridges 16.

Wormwheel 4 has a wormwheel shaft 40 in a known manner, said wormwheel shaft 40 projecting from wormwheel gearing 41 at both ends. Worm wheel 4 is shaped so as to rotate about a wormwheel axis Y, with wormwheel axis Y simultaneously forming the rotational axis of a spindle nut 42. Spindle nut 42 is formed by internal threading of wormwheel shaft 40, which is formed as a hollow shaft. Spindle nut 42 serves to receive a spindle, which during operation of the gearing mechanism, e.g. in the guide rails of a vehicle seat, meshes with a corresponding fixed spindle arranged in one of the rails. When wormwheel 4 rotates, wormwheel 4 is thereby moved back and forth along the fixed spindle. Gear housing 1, in which wormwheel 4 is mounted, is moved back and forth together with wormwheel 4. Here wormwheel 4 is driven via worm 3, located on the top side, and a drive shaft that is connected with the drive shaft receptacle 32 of worm 3.

To mount wormwheel 4, gear housing 1 has a wormwheel space 17 below top part 10 and below worm space 12. Wormwheel space 17 can be bordered by two or more facing closed walls, or preferably by the four legs 11. Two each of the adjacent legs 11 thus form a second side wall 18. A wormwheel support 19 is formed in each of these two facing second side walls 18. The diameter of these wormwheel supports 19 is equal to or greater than an external diameter d1 of wormwheel shaft 40, so that wormwheel shaft 40 is positioned in the two wormwheel supports 19 so that it can rotate about wormwheel axis Y.

To mount wormwheel 4 in wormwheel supports 19, a wormwheel support access opening 20 is formed in the two second side walls 18. Wormwheel support access openings 20 extend from the two wormwheel supports 19 to the underside of the two second side walls 18 and/or to the underside of gear housing 1, so that wormwheel 4 can be mounted from below with wormwheel shaft 40 through wormwheel support access openings 20 upwards into wormwheel support 19.

To support wormwheel 4 and/or wormwheel shaft 40 from below in wormwheel supports 19, the distance d2 between the walls of the wormwheel support access openings 20 is preferably slightly smaller than the external diameter of wormwheel shaft 40. The material of the walls of wormwheel support access openings 20 and/or the material of wormwheel shaft 40 is sufficiently elastic that wormwheel shaft 40 can be pushed against the elastic force from below through wormwheel support access openings 20 into wormwheel supports 19, and after reaching wormwheel supports 19, can be securely supported from below in wormwheel supports 19 by means of the reset walls. To make the mounting of wormwheel shaft 40 into wormwheel support access openings 20 easier, these have downwardly and outwardly beveled walls as insertion bevels 21.

In addition, or alternatively, a housing cover can be mounted onto gear housing 1 from below as a housing closure 2. Housing closure 2 then encloses wormwheel space 17, which would otherwise be open on the bottom. The top wall of housing closure 2 is preferably formed with a rounded shape so that wormwheel space 17 provides sufficient space for wormwheel gearing 41, and the two ends of worm wheel shaft 40 are supported upon correspondingly shaped support surfaces 22. To affix housing closure 2 in gear housing 1, a known locking closure with corresponding locking elements can, for example, be formed on legs 11 of gear housing 1. Particularly preferred, however, are bolt mounts 23 for receiving fastening bolts 24, with the bolt mounts 23 extending as through-holes through legs 11 as well as through a side wall 25 of housing closure 2. The width of side walls 25 preferably then corresponds to the distance d2 between the walls of worm wheel support access openings 20, so that wormwheel space 17 is tightly closed in the direction of the second side walls 18 after wormwheel 4 is mounted. Wormwheel axis Y runs especially in a direction perpendicular to worm axis X, in a known manner for this configuration.

According to an alternative embodiment, a wormwheel 4 with an integrated spindle nut 42 can be replaced by a wormwheel 4 with a wormwheel shaft 40, with a worm gearing being formed on wormwheel shaft 40 in addition to wormwheel gearing 41.

The worm gearing then meshes into the gearing of a tooth rack, which is, for example, located in a fixed position on one of the rails attached to the vehicle floor, in order to move gear housing 1 back and forth along on the tooth rack. In this case, the bottom of gear housing 1 is open from below so as to enable the the tooth rack to mesh, with such a tooth rack possibly extending through the worm gear support access openings 20. In particular, such a tooth rack can also serve as a thrust bearing for wormwheel support 4, so that the narrowing of the distance between legs 11 and/or the walls of wormwheel support access openings 20 then does not need to be less than the diameter d1 of wormwheel shaft 40.

A number of other designs for gear housing 1 are possible. For example, gear housing 1 can be formed as an essentially rectangular housing with an open bottom and with four worm support or wormwheel support access openings 15, 20 extending outward from the bottom through the side walls, said worm support and/or wormwheel support access openings leading up to the respective worm support 14 and/or wormwheel support 19.

Instead of using elastic wall materials, elastic transition areas may also be formed, particularly at the level of wormwheel supports 19 or respectively worm supports 14, in order to temporarily spread apart the downward-extending side walls of wormwheel support access openings 20 or respectively wormwheel support access openings 1, in order to insert wormwheel shaft 40 or respectively worm shaft 30.

Plastic is particularly preferable as a material for gear housing 1, worm 3, and wormwheel 4, because these can be easily produced via an injection molding process. In principle, however, other materials may also be used for producing such a gearing mechanism, especially metal.

A gearing mechanism formed in this way from such a gear housing 1 with a worm 3 and a wormwheel 4 is, for example, used in a configuration pursuant to FIG. 3 in place of the gearing mechanism 6 shown there. Here spindle 62 is led through spindle nut 42. Drive shaft 67 of drive 66 is connected with drive shaft mount 32 of worm shaft 30 of worm 3. The propulsion of drive shaft 67 via drive 66 thereby leads to a rotation of worm 3, which causes wormwheel 4 to rotate correspondingly. Because of the concomitant rotation of spindle nut 42, wormwheel 4 and, via its support in wormwheel supports 19, gear housing 1 are moved back and forth along fixed spindle 62. Together with gear housing 1, upper rail 61, which forms one of the adjustable parts, is displaced via bracket 63 vis-à-vis lower rail 60, which forms the other adjustable part, so that a seat affixed to upper rail 61 is adjusted back and forth relative to the vehicle floor.

FIG. 4 is a schematic representation of individual elements of an alternate configuration of a vehicle seat assembly and a rail guide using a fixed tooth rack 462. In this configuration, gearing mechanism 406 travels along fixed tooth rack 462.

According to an alternative embodiment, wormwheel 4 can also be located in gear housing 1 above worm 3 as an upper gearing element.

Particularly in a configuration of wormwheel 4 as the lower gear element in gear housing 1 with a spindle 62 extending through it, a support enclosing wormwheel shaft 40 from below can also be omitted if spindle 62 holds wormwheel 4, and possibly also worm 3 via wormwheel 4 relative to gear housing 1 from below in the corresponding supports 14, 19.

LIST OF REFERENCE SYMBOLS 1 gear housing
10 top part of 1
11 legs/bar-shaped brackets of 1
12 worm space
13 first side walls of 1
14 worm support
15 worm support access openings
16 retaining ridge in 15
17 wormwheel space
18 second side walls of 1
19 wormwheel support
20 wormwheel support access opening
21 insertion bevel of 20
2 housing closure/cover
22 support in 2 for 40
23 bolt mounts
24 fastening bolts
3 worm
30 worm shaft
31 worm gearing
32 drive shaft mount in 30
X worm axis
4 wormwheel
40 wormwheel shaft
41 wormwheel gearing
42 spindle nut
Y wormwheel axis
d1 diameter of 40
d2 distance between facing walls of wormwheel support access openings 20
d3 diameter of 30
d4 distance between facing walls of wormwheel support access openings 15

The invention claimed is:

1. A gearing mechanism for adjusting two reciprocally adjustable parts adjustable relative to one another, suitable for use with vehicle parts including a seat adjustment device, a window lifter or a sunroof, the gearing mechanism comprising:
 a nonrotating spindle fixable to a first of the two reciprocally adjustable parts;
 a wormwheel, which has a spindle nut non-rotatingly connected thereto in order to drive the spindle and which has a wormwheel shaft;
 a worm positioned to transfer a driving force to the wormwheel and which has a worm shaft;
 a gear housing formed as a single-piece gear body;
 a gear housing closure;
 the gear housing receiving the worm and the wormwheel by insertion of the worm and wormwheel in a common direction into the gear housing, and the gear housing holding the worm and the wormwheel in a supporting manner, with the gear housing fixable to the second of the two reciprocally adjustable parts;
 the gear housing having two first facing walls, each of the two first facing walls having a worm support for receiving the worm shaft;
 the gear housing having two second facing walls, each having a wormwheel support for receiving the wormwheel shaft;
 the gear housing configured to receive the worm and wormwheel rotatably positioned about their respective longitudinal axes with the worm securely mounted in the gear housing and supported by the wormwheel,
 wherein each worm support has a worm support access opening with a distance between walls of the worm support access opening being less than a diameter of the worm shaft, and
 wherein each wormwheel support has a wormwheel support access opening with a distance between walls of the wormwheel support access opening being less than a diameter of the wormwheel shaft,
 and wherein the gear housing closure comprises support surfaces for supporting the wormwheel shaft.

2. A gearing mechanism according to claim 1, wherein each worm support access opening opens in a mounting direction of the worm.

3. A gearing mechanism according to claim 1, wherein the each wormwheel support extends through the respective second facing wall.

4. A gearing mechanism according to claim 1, in which the two first facing walls with the worm supports are formed between the two second facing walls with the wormwheel supports.

5. A gearing mechanism according to claim 1, wherein the two first facing walls and the two second facing walls further comprise legs, with spacing between the legs on the two second facing walls forming the wormwheel support access opening.

6. A gearing mechanism according to claim 5, wherein the gear housing closure is affixed to the legs to close the gear housing.

7. A gearing mechanism according to claim 1, wherein the worm support access opening further comprises at least one retaining ridge.

* * * * *